Nov. 9, 1948.                L. W. MELCHER                2,453,449
                 DYNAMOELECTRIC MACHINE WITH CLOSED
                        AIR CIRCULATING SYSTEM
Filed Oct. 4, 1946                                    4 Sheets-Sheet 1
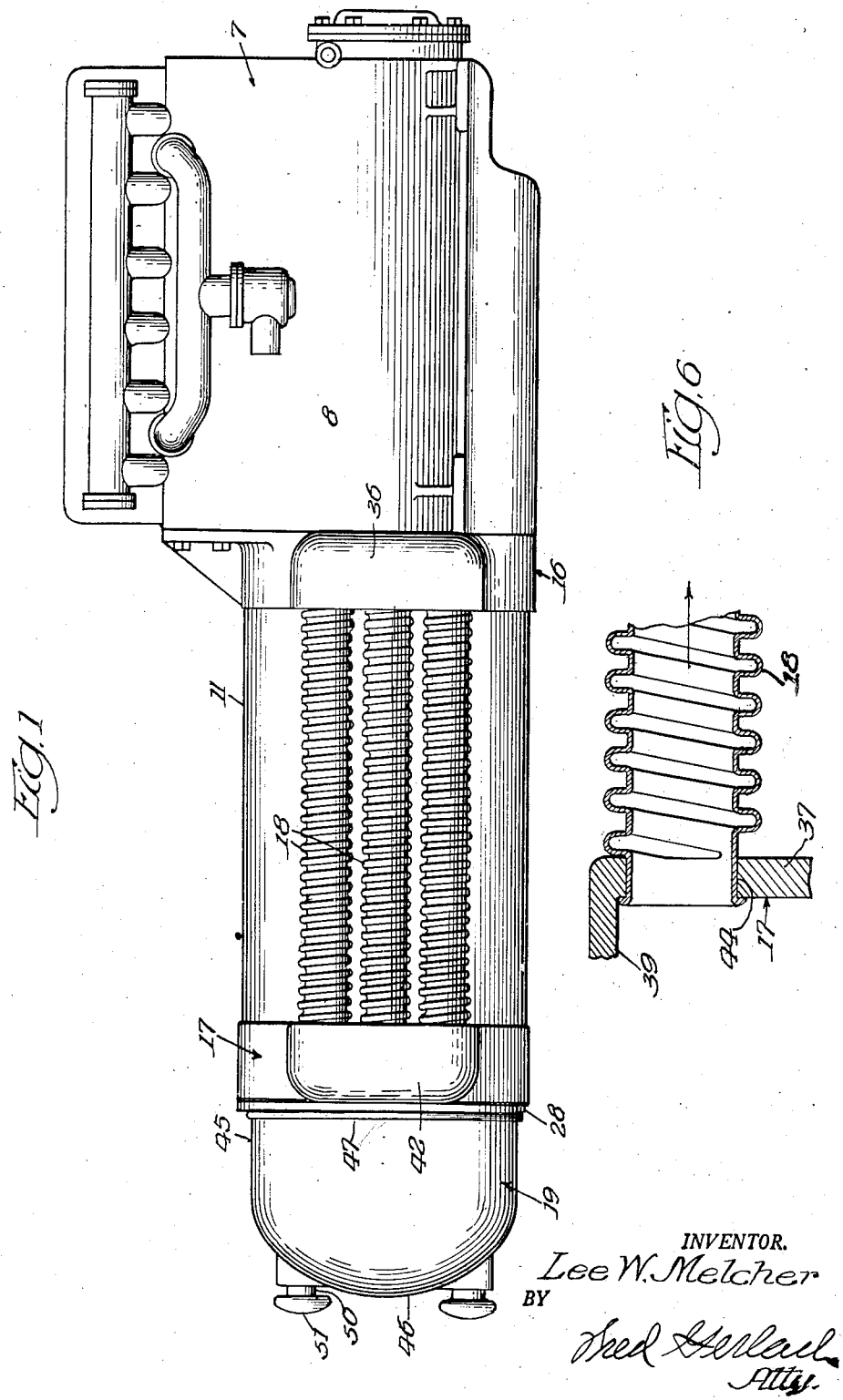
INVENTOR.
Lee W. Melcher
BY

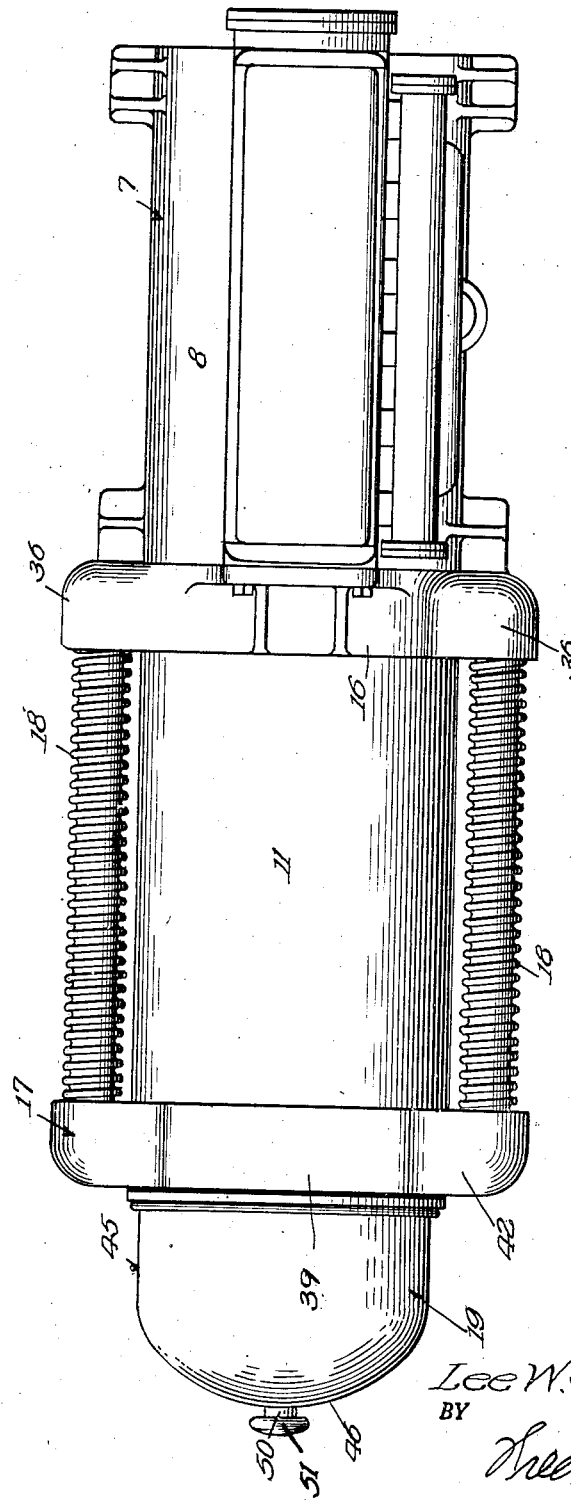

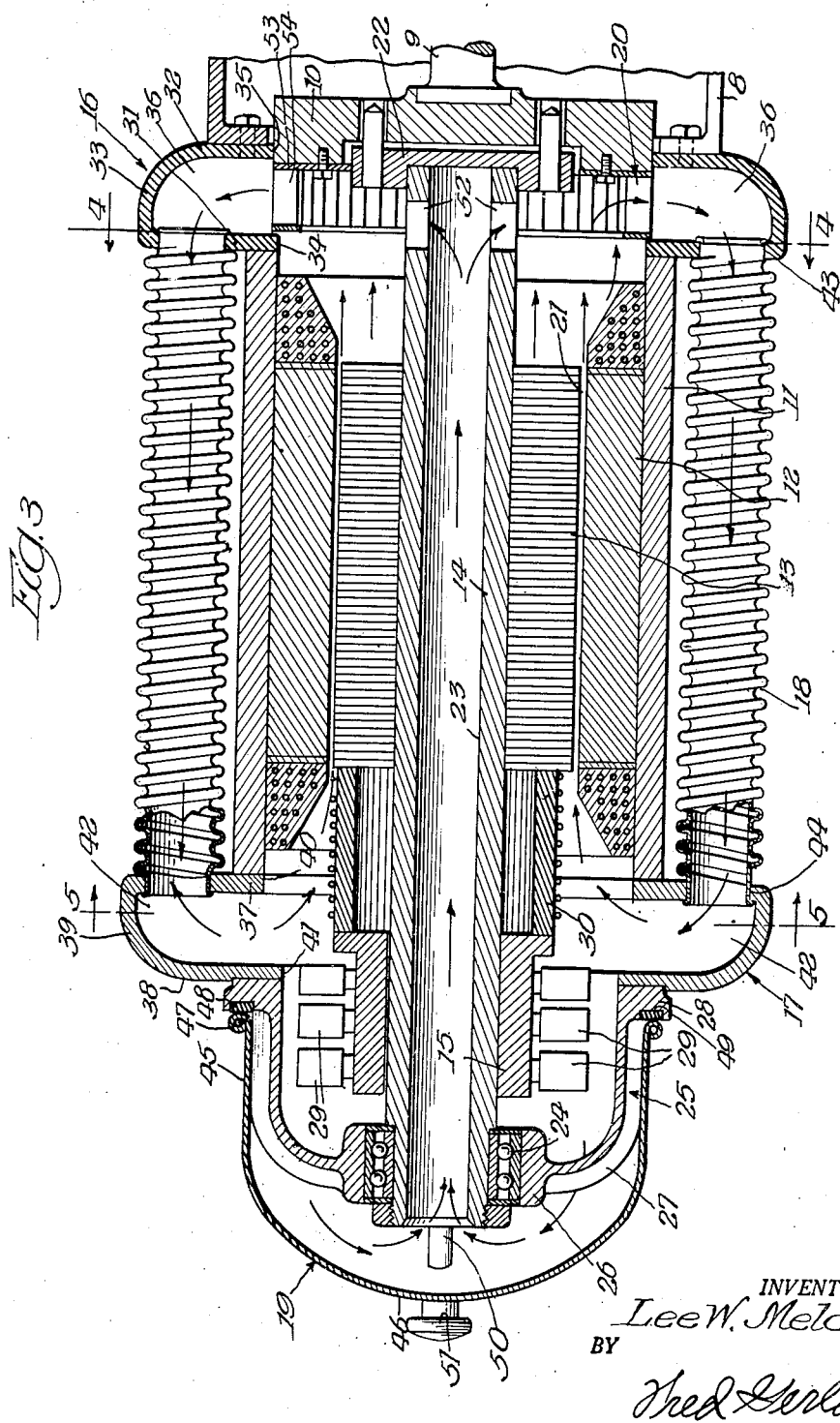

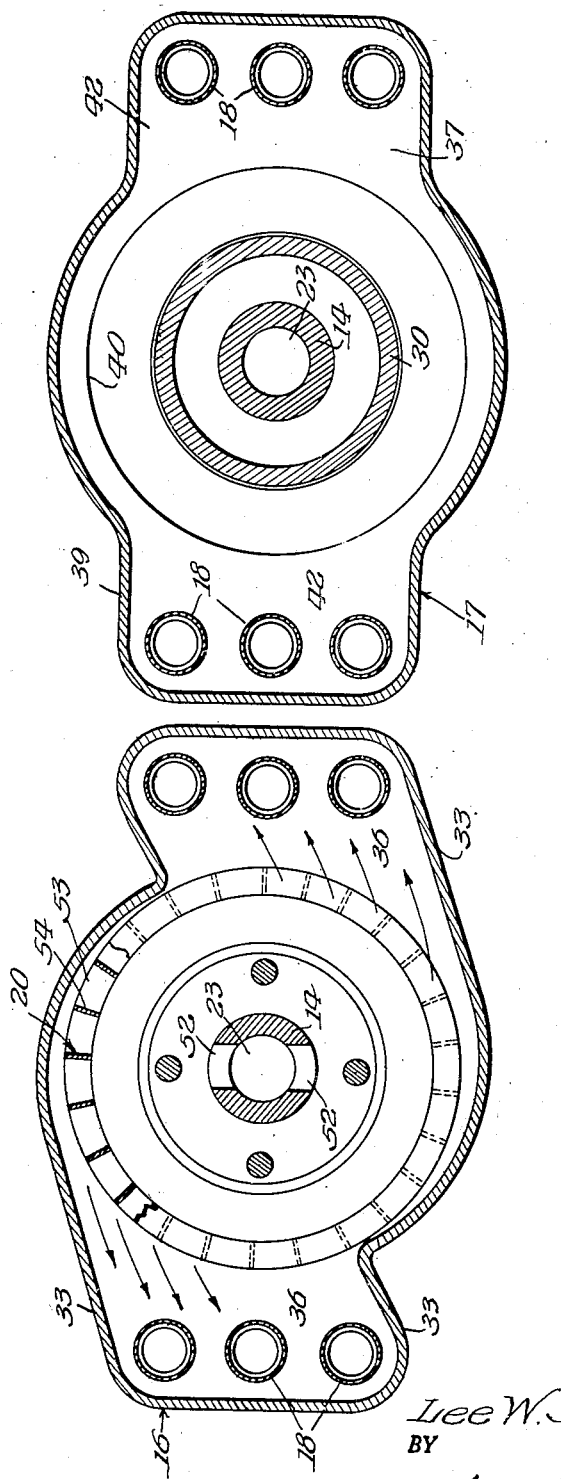

Patented Nov. 9, 1948

2,453,449

UNITED STATES PATENT OFFICE 2,453,449

DYNAMOELECTRIC MACHINE WITH CLOSED AIR CIRCULATING SYSTEM

Lee W. Melcher, Oconomowoc, Wis., assignor to Waukesha Motor Company, Waukesha, Wis.

Application October 4, 1946, Serial No. 701,351

10 Claims. (Cl. 171—252)

The present invention relates generally to dynamo-electric machines. More particularly the invention relates to that type of machine which is capable of functioning either as an electric motor or a generator, embodies a closed air circulating system for dissipating the heat that is created in connection with operation, and as its principal components or parts comprises a housing forming shell, a stator within the shell and in the form of field windings, a rotor within the stator and in the form of an armature, and a commutator carrying shaft for rotatably supporting the armature.

One object of the invention is to provide a dynamo-electric machine of this type which is an improvement upon, and has certain inherent advantages over, previously designed machines and is characterized by the fact that the closed air circulating system for dissipating the heat that is created during operation of the unit is of new and improved construction and in addition is so designed that it possesses exceedingly high efficiency and makes it possible materially to reduce the size of the machine and also to use the machine in instances where the temperature of the ambient air is high.

Another object of the invention is to provide a dynamo-electric machine of the type and character under consideration in which the armature shaft is hollow from end to end and the closed air circulating system comprises a plurality of externally disposed, longitudinally extending heat exchanger tubes together with a fan which is connected for conjoint drive with the armature shaft and operates when driven to cause the air in the system to flow repeatedly first through the armature shaft and the tubular air passage between the armature and the stator and then through the heat exchanger tubes.

Another object of the invention is to provide a dynamo-electric machine of the last mentioned character in which the closed air circulating system for effecting dissipation of the heat comprises a pair of manifolds, one of which is connected to, and located directly outwards of, one end of the shell, surrounds the fan, is in communication with one end of the armature shaft, and has a pair of oppositely disposed extensions to which the adjacent ends of the heat exchanger tubes are connected, and the other of which is secured to, and located directly outwards of, the other end of the shell, surrounds, and is in communication with, the adjacent end of the armature shaft and has opposed side extensions to which the other ends of the heat exchanger tubes are connected.

A further object of the invention is to provide a dynamo-electric machine of the aforementioned type and character in which the commutator for the armature is mounted on the end of the armature shaft that is remote from the fan, is disposed outwards of the adjacent manifold of the closed air circulating system, and is housed within a cup-shaped housing which is removably secured in place, forms part of the closed air circulating system and, when removed, exposes the commutator for inspection or repair purposes.

A still further object of the invention is to provide a dynamo-electric machine which is generally of new and improved construction and effectively and efficiently fulfills its intended purpose.

Other objects of the invention and the various advantages and characteristics of the present dynamo-electric machine will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a side view of a dynamo-electric machine embodying the invention;

Figure 2 is a plan view;

Figure 3 is an enlarged horizontal section taken on the line 3—3 of Figure 1 and illustrating in detail the construction and design of the closed air circulating system for dissipating the heat that is created in connection with operation of the machine;

Figure 4 is a vertical transverse section taken on the line 4—4 of Figure 3 and showing the construction and arrangement of the manifold that surrounds the fan for causing the air to circulate repeatedly first through the hollow armature shaft and the tubular air passage between the armature and the stator and then through the externally disposed heat exchanger tubes;

Figure 5 is a vertical transverse section taken on the line 5—5 of Figure 3 and showing the construction and design of the other manifold; and Figure 6 is an enlarged fragmentary section illustrating the manner in which the ends of the heat exchanger tubes are connected to the side extensions of the manifolds of the closed air circulating system.

The machine which is shown in the drawings constitutes the preferred form or embodiment of the invention and may be used either as an electric motor or generator, depending upon how it is operated and electrically connected. It is illustrated in the drawings as being a generator and as being associated with, and connected to, an internal combustion engine 7. The engine 7 is of standard or conventional design and serves as a prime mover or driving instrumentality for the unit. It comprises a crank case 8 and a crank shaft 9. The crank shaft is journalled in bearings (not shown) in the crank case and has at its rear end a flywheel 10. As its principal components or parts the machine comprises a shell 11, a stator 12, a rotor in the form of an armature 13, an armature shaft 14, a commutator 15, a pair of manifolds 16 and 17, a plurality of heat exchanger tubes 18, a cup-shaped housing 19 and a fan 20. As hereinafter described more in detail, the hollow armature shaft 14, the manifolds 16 and 17, the tubes 18, the housing 19 and the fan 20 constitute a closed air circulating system which when the machine is in operation serves to dissipate the machine created heat. The unit is longitudinally aligned with, and projects outwards from the rear end of, the crank case 8 of the engine 7.

The shell 11 of the machine is cylindrical. It surrounds the stator and rotor and is open ended. The stator 12 is in the form of field windings or coils and fits within, and is suitably secured to, the central portion of the inner face or periphery of the shell 11. It is of conventional design or construction and causes or effects, in connection with drive or rotation of the armature, the generation of electrical current in the armature. The armature 13 is disposed within the field windings constituting the stator 12. It is of conventional design or construction and is spaced from the stator in order to form a tubular air passage 21 therebetween. As shown in the drawings, the armature surrounds, and is fixedly secured to, the central portion of the armature shaft 14. Such shaft is hollow or tubular from end to end and has one end thereof connected to the flywheel 10 of the internal combustion engine 7 by way of a coupling 22 in order that it, together with the armature, is driven by the engine in connection with operation of the latter. The inner periphery of the armature shaft defines a full length, longitudinal, centrally disposed air passage 23. The other or outer end of the armature shaft is rotatably supported by way of a ball bearing 24 which is carried by a spider-like bracket 25. The latter consists of a ring shaped hub 26, a plurality of legs 27 and a ring-shaped rim 28. The legs 27 of the bracket are joined to, and extend outwards and then inwards from, the hub 26. The outer ends of the legs are welded or otherwise fixedly secured to the ring shaped rim 28. The inner race of the ball bearing 24 extends around, and is fixedly secured in any suitable manner to, the outer end of the armature shaft 14 and the outer race of the bearing fits within, and is keyed or otherwise fixedly secured to the ring shaped hub 26 of the bracket 25. The commutator 15 is mounted on, and fixedly secured to, the outer end of the armature shaft 14 and is disposed between, and spaced from, the ball bearing 24 and the adjacent end of the armature 13. It has brushes 29 associated therewith. These are carried by the spider-like bracket 25. The commutator 15 is of standard or conventional design and has the risers thereof electrically connected to the windings of the armature 13 by way of an annular series of spaced apart, longitudinally extending bars 30. As best shown in Figure 3 the outer end of the armature shaft projects outwards of the outer end of the cylindrical shell 11. The armature shaft is driven in a counterclockwise direction as view in Figure 4.

The manifold 16 surrounds the inner end of the armature shaft. It is preferably in the form of a one-piece metal casting and comprises an inner end wall 31, an outer end wall 32 and a continuous side wall 33. The inner end wall 31 is bolted or otherwise fixedly secured to the inner end of the shell 11 and has a centrally disposed circular hole 34 which is the same in diameter as, and registers with, the inner periphery of the shell and establishes communication between the interior of the manifold 16 and the inner end portion of the interior of the shell. The outer end wall 32 of the manifold 16 is bolted to the rear end wall of the crank case 8 of the internal combustion engine 7 and has a centrally disposed circular hole 35. The flywheel 10 on the rear end of the engine crank shaft 9 fits within the hole 35, as shown in Figure 3 of the drawings. The continuous side wall 33 of the manifold 16 extends between, and is formed integrally with, the outer marginal portions of the two end walls 31 and 32 and serves to hold the latter in spaced apart relation. The side portions of the manifold 16 are shaped to form a pair of oppositely disposed hollow extensions 36. These extensions project outwards of the side portions of the shell 11 and are shaped as shown in Figure 4. The other manifold, i. e., the manifold 17, surrounds the outer end of the armature shaft 14 and, like the manifold 16, is preferably in the form of a one-piece metal casting. It is located directly outwards of the outer end of the shell 11 and consists of an inner end wall 37, an outer end wall 38 and a continuous side wall 39. The inner end wall 37 is bolted or otherwise suitably secured to the outer end of the shell 11 and has a centrally disposed circular hole 40 which is the same in diameter as, and registers with, the inner periphery of the shell and serves to establish communication between the interior of the manifold 17 and the outer end portion of the interior of the shell 11. The outer end wall 38 of the manifold 17 has a centrally disposed circular hole 41 and this is substantially the same in diameter as, and is arranged in concentric relation with, the circular hole 40 in the inner end wall 37. The continuous side wall 39 extends between, and is formed integrally with, the outer marginal portions of the inner and outer end walls 37 and 38 and serves to space the latter apart. The side portions of the manifold 17 are shaped to form a pair of opposed hollow side extensions 42 which, as shown in Figure 3, project outwards of the side portions of the shell 11 and are horizontally aligned with the side extensions 36 of the manifold 16. The ring shaped rim 28 of the spider-like bracket 25 fits against, and is bolted to, the inner marginal or hole defining portion of the outer end wall 38 of the manifold 17.

The heat exchanger tubes 18 are disposed outwards of the side portions of the shell 11 and extend longitudinally of the shell. Preferably there are three tubes adjacent each side portion of the shell. The tubes extend and establish communication between the side extensions 36 of the manifold 16 and the side extensions 42 of the manifold 17. The inner ends of the tubes fit and are suitably secured within holes 43 in the inner end wall 34 of the manifold 16 and the other or outer ends of the tubes fit and are suitably secured within holes 44 in the inner end wall 37 of the outer manifold 17. The tubes 18 are helically or spirally corrugated from end to end and serve as heat exchangers for the closed air circulating system consisting of the hollow armature shaft 14, the manifolds 16 and 17, the tubes 18, the housing 19 and the fan 20. As hereinafter described more in detail, air under pressure enters the side extensions 36 of the manifold 16 and then flows through the heat exchanger tubes 18 and into the hollow side extensions 42 of the manifold 17. By having the tubes 18 helically or spirally corrugated from end to end the heat dissipating property of the tubes is materially increased and there is a minimum amount of resistance to the flow of air under pressure through the tubes. In addition, the tubes are self-scavenging by reason of the fact that the air under pressure while flowing therethrough, swirls or whirls around the tubes and hence so wipes the inner surface of the tubes as to prevent accumulation of dust and other foreign material that might reduce the heat transfer efficiency of the tubes.

The cup shaped housing 19 when in its normal or operative position surrounds and houses the outer end of the armature shaft 14, the commutator 15, the brushes 29 and the bearing carrying bracket 25. It is preferably in the form of a one-piece sheet metal stamping and comprises a cylindrical side wall 45 and a concavo-convex circular outer end wall 46. The outer marginal portion of the end wall 46 is joined to, and formed integrally with, the outer end margin of the side wall. The inner end margin of the housing side wall 45 is rolled to form an annular bead 47 which when the housing is in place fits against a packing ring 48 which is seated within an annular groove 49 in the ring shaped rim 28 of the spider-like bracket 25. A pair of bolts 50 serves removably to secure the housing 19 in place. These bolts extend through holes in the outer end wall 46 of the housing 19 and have knobs 51 on their outer ends whereby they may be turned. The inner ends of the bolts are adapted to fit within internally threaded holes (not shown) in certain of the legs 27 of the spider-like bracket 25. When it is desired to remove the housing the bolts are turned out of engagement with the aforementioned internally threaded holes. This releases the housing so that it may be shifted axially away from the bracket 25. When the housing is removed the commutator, brushes and bearing carrying bracket are exposed and hence may readily be inspected, repaired or replaced.

The fan 20 is disposed within the manifold 16 and surrounds the inner end of the hollow or tubular armature shaft 14. As shown in Figure 3, said end of the armature shaft is provided with a pair of diametrically opposite, transversely extending holes 52 in order to establish communication between the inner end of the interior of the armature shaft and the interior of the manifold 16. The fan 20 is of the so-called squirrel cage variety and comprises a pair of laterally spaced rings 53 and an annular series of radially extending blades 54 between the rings. One of the rings is bolted to the outer marginal portion of the flywheel 10 in order that the fan is driven conjointly with the armature shaft and armature in connection with operation of the engine 7. The fan 20 is disposed adjacent the inner marginal portions of the inner and outer end walls 31 and 32 of the inner manifold 16. As shown in Figure 4, the continuous side wall 33 of the manifold 16 is shaped to form a double volute casing for the fan, the outlets of such casing being the hollow side extensions 36 which, as heretofore described, are connected to the hollow side extensions 42 of the manifold 17 by the heat exchanger tubes 18.

In connection with drive or rotation of the armature shaft 14 the fan 20 operates to draw air longitudinally through the passage 23 in the armature shaft and the tubular passage 21 between the armature and the stator as indicated by arrows in Figure 3. The air which is drawn through the passage 23 flows outwards into the space within the blades 54 of the fan. The air which is drawn into the interior of the manifold 16 is forced under pressure to flow successively through the hollow side extensions 36 of the manifold 16, the helically or spirally corrugated heat exchanger tubes 18 and the hollow side extensions 42 of the manifold 17. From the hollow side extensions 42 a portion of the air under pressure flows inwards into the receiving end of the tubular air passage 21 and the balance of the air flows outwards past the commutator and into the outer or receiving end of the longitudinal passage 23 in the armature shaft 14. During drive or rotation of the armature shaft the fan is driven conjointly with the shaft and operates to maintain a continuous circulation of air in the unit. The air during flow through the passages 21 and 23 absorbs heat from the stator and rotor of the unit and such heat is dissipated to the ambient or surrounding air during flow of the air under pressure through the externally disposed heat exchanger tubes 18.

The herein described dynamo-electric machine, due to the particular closed air cooling system that is incorporated therein and forms a part thereof, is highly efficient insofar as operation is concerned and may be used in instances where the ambient air is at a comparatively high temperature. It also may be used effectively and efficiently in instances where the ambient air is heavily ladened with dust. Because of the high efficiency of the closed air circulating system it is possible so as to construct the machine that it is small in size while at the same time has a comparatively large capacity.

The invention is not to be understood as restricted to the details set forth since these may be modified within the scope of the appended claims without departing from the spirit and scope of the invention.

Having thus described the invention what I claim as new and desire to secure by Letters Patent is:

1. A dynamo-electric machine comprising an elongated shell having closure members at its ends, a stator in the shell, an armature within the stator, a rotary shaft for the armature, extending lengthwise through the shell and having a longitudinal open ended passage therein, a hollow heat exchanger disposed exteriorly of the shell, having the interior thereof in communication with the ends of the passage in the armature shaft, and forming with said passage a closed air circulating system, and a fan disposed in the system and arranged and adapted during drive thereof to cause the air in the system to circulate repeatedly first through said passage and then through the heat exchanger.

2. A dynamo-electric machine comprising an elongated shell having closure members at its ends, a stator disposed within, and extending around, the shell, an armature within the stator and spaced therefrom so as to form a tubular passage therebetween, a rotary shaft for the armature, extending lengthwise through the central portion of the shell and having a longitudinal open ended passage therein, a hollow heat exchanger disposed exteriorly of the shell, having the interior thereof in communication with the ends of the two passages, and forming with said passages a completely closed air circulating system, and a fan disposed in the system and arranged and adapted during drive thereof to cause the air in the system to circulate repeatedly first through the passages and then through the heat exchanger.

3. A dynamo-electric machine comprising an elongated shell with closure members at its ends, a stator disposed within, and extending around, the shell, an armature disposed within the stator and spaced therefrom so as to provide a tubular passage therebetween, a rotary shaft for the armature, extending lengthwise through the central portion of the shell, and having a longitudinal open ended passage therein, a plurality of parallel spaced apart heat exchanger tubes disposed exteriorly and extending lengthwise of the shell, having certain adjacent ends thereof in communication with adjacent ends of the two passages and their other ends in communication with the other ends of said passages, and forming with the passages a completely closed air circulating system, and a fan disposed in the system and arranged and adapted during drive thereof to cause air in the system to circulate repeatedly first through said passages and then through the heat exchanger tubes.

4. A dynamo-electric machine comprising an elongated shell having closure members at its ends, a stator disposed within, and extending around, the shell, an armature within the stator, a rotary shaft for supporting the armature, extending lengthwise through the central portion of the shell and having a longitudinal open ended passage therein, a helically corrugated heat exchanger tube positioned externally and extending lengthwise of the shell, having the ends thereof in communication with the ends of said passage, respectively, and forming with said passage a closed air circulating system, and a fan disposed in the system and arranged and adapted during drive thereof to cause the air in the system to circulate repeatedly first through said passage and then through the heat exchanger tube.

5. A dynamo-electric machine comprising an elongated shell, a stator in the shell, an armature within the stator, a rotary shaft for supporting the armature, extending longitudinally through the shell and having a longitudinal open ended passage therein, a manifold extending across and connected to one end of the shell and having the interior thereof in communication with the adjacent end of the passage, a manifold extending across and connected to the other end of the shell and having its interior in communication with the other end of the passage, a hollow heat exchanger disposed exteriorly of the shell, extending between, and having the interior thereof in communication with, the manifolds and forming with said manifolds and the passage a closed air circulating system, and a centrifugal type fan positioned in one of the manifolds, connected for conjoint rotation with the armature shaft and adapted when rotated to cause the air in the system to circulate repeatedly through said system.

6. A dynamo-electric machine comprising an elongated shell, a stator in the shell, an armature disposed within the stator and spaced therefrom so as to provide a tubular passage therebetween, a rotary shaft for supporting the armature, extending longitudinally through the central portion of the shell and having a longitudinal open ended passage therein, a manifold extending across and connected to one end of the shell and having the interior thereof in communication with the adjacent ends of the passages, a manifold extending across and connected to the other end of the shell and having its interior in communication with the other ends of the passages, a plurality of parallel, spaced apart heat exchanger tubes disposed exteriorly and extending lengthwise of the shell, having certain adjacent ends thereof connected to, and in communication with the interior of, the first mentioned manifold and their other ends connected to, and in communication with the interior of, the second mentioned manifold, and forming with said manifolds and the two passages a closed air circulating system, and a centrifugal type fan positioned in one of the manifolds, connected for conjoint rotation with the armature shaft and adapted when rotated to cause the air in the system to circulate repeatedly through said system.

7. A dynamo-electric machine comprising an elongated shell, a stator in the shell, an armature within the stator, a rotary shaft for supporting the armature, extending longitudinally through the central portion of the shell and having a longitudinal open ended passage therein, a manifold extending across and connected to one end of the shell, having the interior thereof in communication with the adjacent end of the passage, and provided with a hollow side extension projecting outwards of the shell, a manifold extending across and connected to the other end of the shell, having its interior in communication with the other end of the passage, and provided with a hollow side extension projecting outwards of the shell and aligned with the extension of the first mentioned manifold, a heat exchanger tube disposed exteriorly and extending lengthwise of the shell, having the ends thereof connected to, and communicating with the interiors of, the two side extensions, and forming with the manifolds and the passage a closed air circulating system, and a centrifugal type fan positioned in one of the manifolds, connected for conjoint rotation with the armature shaft and adapted when rotated to cause the air in the system to circulate repeatedly through said system.

8. A dynamo-electric machine comprising an elongated shell, a stator disposed in, and extending around, the shell, an armature positioned within the stator and spaced therefrom so as to provide a tubular passage therebetween, a rotary shaft for supporting the armature, extending longitudinally through the central portion of the shell and having a longitudinal open ended passage therein, a manifold extending across and connected to one end of the shell, having the interior thereof in communication with the adjacent ends of the two passages and provided with hollow side extensions projecting outwards of the shell, a manifold extending across and connected to the other end of the shell, having its interior in communication with the other ends of the passages, and provided with hollow side extensions projecting outwards of the shell and aligned with the side extensions of the first mentioned manifold, a plurality of parallel heat exchanger tubes disposed exteriorly and extending lengthwise of the shell, having the ends thereof connected to, and communicating with the interiors of, the side extensions and forming with the manifolds and said passages a closed air circulating system, and a centrifugal type fan positioned in one of the manifolds, connected for conjoint rotation with the armature shaft and adapted when rotated to cause the air in the system to circulate repeatedly through said system.

9. A dynamo-electric machine comprising a substantially cylindrical shell, a stator disposed within, and extending around, the shell, an armature positioned within the stator and spaced therefrom so as to form a tubular passage therebetween, a rotary shaft for supporting the armature, extending longitudinally through the central portion of the shell, embodying a longitudinal, open ended passage, having one end thereof projecting beyond the adjacent end of the shell and provided with a commutator, a manifold extending across and connected to the other end of the shell and having the interior thereof in communication with the adjacent ends of the passages, a narrow ring shaped manifold extending across and connected to said adjacent end of the shell, disposed inwards of the commutator and having the interior thereof in communication with the other end of the passage between the stator and the armature, a removably mounted cup-shaped housing extending around, and spaced from, said projecting end of the armature shaft and the commutator and arranged to establish communication between the interior of the second mentioned manifold and the other end of the passage in the shaft, a hollow heat exchanger disposed exteriorly of the shell, connected to, and communicating with, the two manifolds, and forming with said manifolds, the housing and the passages a closed air circulating system, and a centrifugal type fan positioned in the first mentioned manifold, connected for conjoint rotation with the armature shaft and adapted when rotated to cause the air in the system to circulate repeatedly through said system.

10. A dynamo-electric machine comprising a substantially cylindrical shell, a stator disposed within, and extending around, the shell, an armature positioned within the stator and spaced therefrom so as to form a passage therebetween, a rotary shaft for supporting the armature, extending longitudinally through the central portion of the shell, embodying a longitudinal open ended passage and having one end thereof projecting beyond the adjacent end of the shell and provided with a commutator, a ring shaped manifold extending across and connected to the other end of the shell, having the interior thereof in communication with the adjacent ends of the two passages and provided with a hollow side extension projecting laterally outwards with respect to the shell, an inner ring shaped manifold extending across, and connected to, said adjacent end of the shell, disposed inwards of the commutator, consisting of inner and outer spaced apart end walls and a continuous side wall between the outer margins of the end walls, having the interior thereof in communication with the other end of the passage between the stator and the armature, and provided with a hollow side extension projecting laterally outwards with respect to the shell and in alignment with the first mentioned extension, a removably mounted cup-shaped housing extending around and spaced from said projecting end of the armature shaft and the commutator, and arranged in sealed relation with the second mentioned manifold so as to establish communication between the interior of the latter and the other end of the passage in the shaft, a heat exchanger tube disposed exteriorly and extending lengthwise of the shell, having the ends thereof connected to, and in communication with, the interiors of the side extensions, and forming with said manifolds, the housing and the passages a closed air circulating system, and a centrifugal type fan positioned in the first mentioned manifold, connected for conjoint rotation with the armature shaft and adapted when rotated to cause the air in the system to circulate repeatedly through said system.

LEE W. MELCHER.

REFERENCES CITED

The following references are of record in the file of this patent:

UNITED STATES PATENTS

| Number | Name | Date |
| --- | --- | --- |
| 1,386,934 | Jacoby | Aug. 9, 1921 |
| 1,772,655 | Yeager | Aug. 12, 1930 |

FOREIGN PATENTS

| Number | Country | Date |
| --- | --- | --- |
| 372,957 | Great Britain | May 19, 1932 |